May 15, 1951
E. J. HOUDRY
2,552,555
PROCESS OF PREVENTING DETONATION IN INTERNAL-COMBUSTION ENGINES AND MEANS ADAPTED TO PRACTICE SAID PROCESS
Filed Dec. 6, 1947
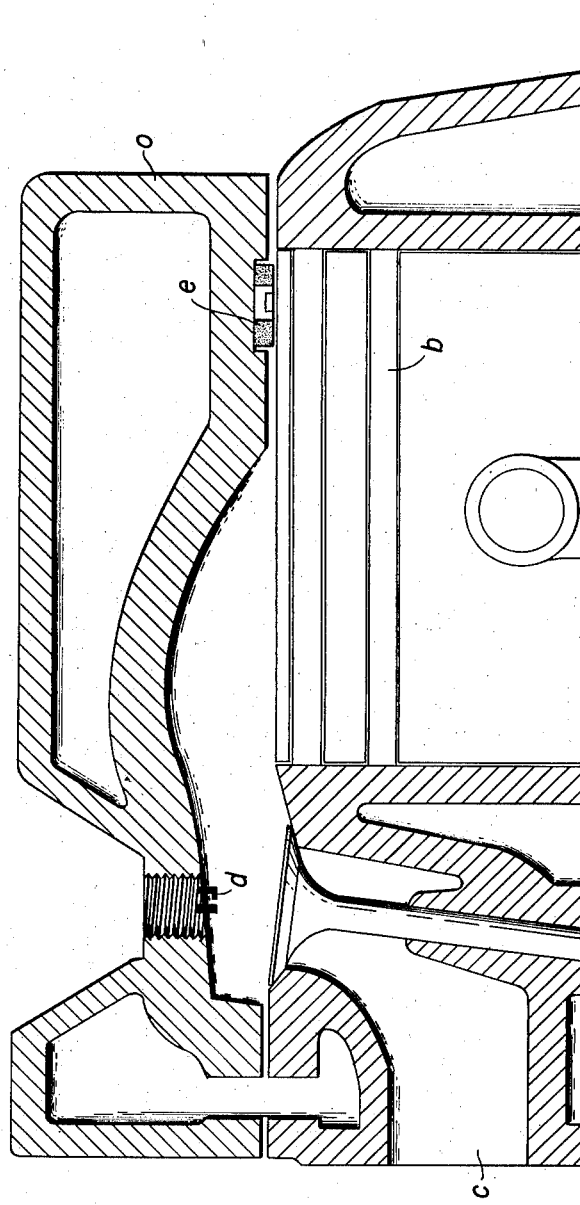
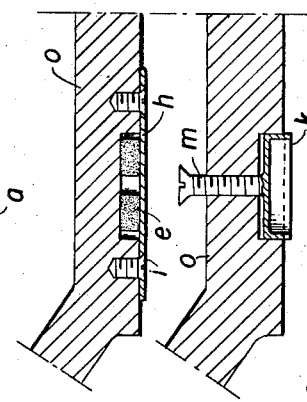
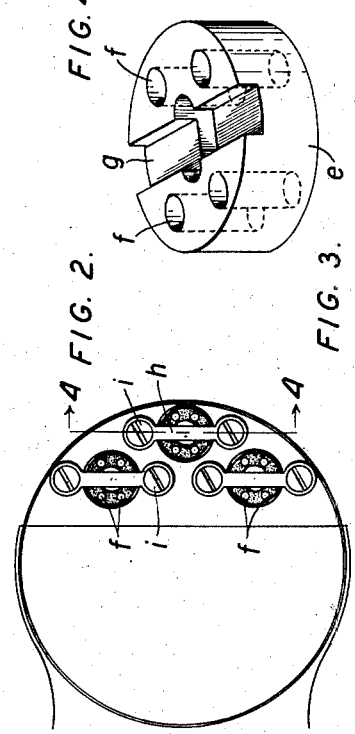
INVENTOR.
EUGENE J. HOUDRY
BY
ATTORNEYS Patented May 15, 1951

2,552,555

UNITED STATES PATENT OFFICE 2,552,555

PROCESS OF PREVENTING DETONATION IN INTERNAL-COMBUSTION ENGINES AND MEANS ADAPTED TO PRACTICE SAID PROCESS

Eugene J. Houdry, Ardmore, Pa.

Application December 6, 1947, Serial No. 790,216

11 Claims. (Cl. 123—191)

In the operation of internal combustion engines detonation occurs when the flame has travelled a distance of about two-thirds way across the chamber and when the piston is near top dead center with the crank angle between —1° and +5°. Photographs of flame in a glass-topped cylinder reveal detonation points that are located in an area including approximately the last third of the path of flame travel.

The function of tetraethyl lead, added to the motor fuel, as a knock-suppressant is well known. There are sound reasons for the belief that its efficiency is due to the fact that it acts as an oxidizing catalyst and prevents detonation by effecting, with increasing speed, substantially complete oxidation of the charge, including more particularly that part of the charge that, as above explained, would otherwise be subject to detonation.

The addition of tetraethyl lead to gasoline is not an ideal solution of the problem of avoiding knock. Although added in very small proportion it is expensive and motor fuel containing it is therefore sold as a premium fuel. Its use is by no means without objection, since it has a pronounced and well-recognized deleterious effect on certain engine parts.

Whether or not the efficiency of tetraethyl lead as a knock-suppressant may be explained on the theory that it functions as an oxidizing catalyst, the assumption that it may be so explained suggested to me the possibility of effecting catalytic oxidation of the charging fuel by some other simpler and certainly more efficient way than by the addition of an oxidation catalyst to the gasoline itself. My conception involved the insertion of an oxidizing catalyst in the piston chamber in such position that it would be effective to oxidize the charge, and particularly that part of the charge which, when the piston approaches its top dead center as above explained, is within the zone wherein detonation has been shown to occur. This in turn involved the conception of locating one or more small oxidizing catalyst units at advance points in the transverse direction of flame travel, that is, near that side of the cylinder most remote from the locus or spark ignition. Before explaining the embodiment of the conception in more detail, special reference is made to the drawing in which:

Fig. 1 is a longitudinal section of that part of the engine cylinder adjacent the cylinder head, with oxidizing catalyst units applied thereto. Fig. 2 is an inverted plan view of the cylinder head showing one way of applying the catalyst units thereto. Fig. 3 is a perspective view of one of the catalyst units. Fig. 4 is a section on the line 4—4 of Fig. 2. Fig. 5 is a detail sectional view of means for adjusting a catalyst unit in its pocket.

Within the cylinder $a$ reciprocates the piston $b$, the latter being shown in a position approximating that at which detonation is most likely to occur. $c$ is the air-fuel admission valve. $d$ is the locus of spark-ignition. These elements require no specific description, being conventional.

Near the wall of the cylinder opposite the locus of spark ignition, the cylinder head $o$ is recessed in its under face at several points (three are shown) to receive blocks or units $e$ of catalytic material, which may be, for example, activated alumina pelleted and impregnated with finely divided copper-chromium oxides. Any oxidizing catalyst will function with efficiency in various degrees. Examples of such catalysts are listed in an application filed by me, Ser. No. 783,561, filed November 1, 1947, among which are preferred the class of catalysts, including the specific example above specified in which active alumina, magnesia or thoria is impregnated with, or has deposited thereon, one or more of the elements copper, chromium, platinum or silver. The invention is not limited to the use of any particular catalyst.

The catalyst units and the pockets for their reception may be of circular contour. The catalyst units may be provided with holes $f$ to afford a larger area of surface contact. Each unit may project slightly above the inner face of the cylinder head and is provided with a cross-groove $g$, through which extends a metal strip $h$, which is secured at opposite ends to the cylinder head by means of screws $i$.

Care must be taken to maintain the alumina-chromium-copper at a temperature at which oxidation takes place but below auto-ignition temperature. An efficient temperature is 600–1100° F. The desired temperature condition may be maintained by any suitable means, as by heat exchange between the cylinder head and the catalyst. With a cylinder volume of 1000 cc., about 2000 cubic millimeters of catalyst is preferred. As little as 500 cubic millimeters will function with some efficiency and a larger amount of catalyst than that above specified is permissible but unnecessary. 2000 cubic millimeters of catalyst is equal to only $2/1000$ of piston displacement in the size of cylinder above stated. Care should also be taken to so locate the catalyst unit that it will not seat too deeply in the pocket or project too greatly above the mouth of the pocket. Specific verbal instruction on this point is less informative than a drawing. If the dimensioning and proportioning of the catalyst and its pockets shown in Fig. 1 are adhered to, the desired result will be achieved. For experimental purposes it may be stated also that by mounting the catalyst on a special support $k$ and by adjusting a screw $m$ (as shown in Fig. 5) the positioning of the catalyst may be easily adjusted so as to bring it within the desired temperature range, preferably that above specified. In my reduction to practice in an air-cooled engine the temperature of the cylinder head at one millimeter above the catalyst was determined by thermo-couple and was found to be 480° F. The temperature of the catalyst itself is controlled by the temperature of that part of the wall of the cylinder head that surrounds the catalyst. Obviously, however, the shape, size and positioning of the catalyst may be different from those shown in the drawing. Other and different ways of holding the catalyst within a given temperature range may be adopted. The final and most efficient adjustment and arrangement may be found by test for any type of engine and what is found to be the most efficient adjustment and arrangement may thus be standardized.

To ascertain the efficiency of this invention I used an air-cooled engine having a compression ratio of 5.5 to 1. The engine was run under load so as to bring the R. P. M. on the low side of the range recommended for this type of engine. Runs were made with iso-octane gradually lowered in octane number by addition of straight heptane (0 octane number) until the engine started knocking, which happened when blending 40 parts of straight heptane with 60 parts of iso-octane (this blended gasoline having a 60 octane number). Then the oxidation catalyst was placed in the cylinder head and the same procedure was adopted. The motor did not knock when 60 parts of straight heptane were added to 40 parts of iso-octane (the blended gasoline having a 40 octane number). The knocking occurred only when a 35 octane blend was used. Thus at least twenty octane points are gained by applying my invention as above described. When engine running conditions will require a high octane gasoline performance a slightly less pronounced gain, measured in octane number, may be achieved; but in all cases the increase in octane number compares more than favorably with any increase in octane number securable by the adition in usual quantity of tetraethyl lead to the gasoline itself. The stated gain in octane number of the gasoline may be somewhat misleading, since the gasoline itself as produced by the refiner is not improved in quality; and in the engine cylinder only about that part of the charge is improved in quality which, at the specified time and at the specified location, would otherwise detonate. In other words, it is obvious that since that part of the charge that causes, or is susceptible of, knocking, is oxidized, the addition of an anti-knock material to the gasoline itself would be purposeless.

The catalyst itself will function successfully in continuous service for at least more than a year.

The catalyst need not be positioned in the cylinder head. It may be positioned at a corresponding position on the piston and when in position thereon would effect oxidation of a larger proportion of the charge, while at the same time it would be in proper position to effect oxidation of that part of the charge which, at a given position of the piston, would otherwise be susceptible to knocking.

While the described location of the catalyst may not be essential to operativeness, since some other location may be operative in greater or less degree, any different location of the catalyst may make difficult such control of catalyst temperature as would effect nearly or quite complete oxidation of the unoxidized fraction of the fuel mixture and thus positively insure against detonation.

In addition to the pronounced advantages of my invention as compared with the addition of anti-knock additives to the gasoline itself, other advantages, not foreseen, developed in actual use.

While the engine was run with oxidation catalyst applied to the cylinder head, it was found that deposits of carbonaceous material were practically eliminated on the cylinder head, while when running without it carbon deposition was appreciable.

When ten cubic centimeters of catalyst mass were inserted in the combustion chamber—a mass equal to about $\frac{1}{100}$ of piston displacement—the engine was kept running indefinitely without using spark ignition. Combustion efficiency was 90%. A thermo-couple located near catalyst in the combustion chamber indicated a very steady temperature of 1380° F. at constant 2000 R. P. M.

Combustion efficiency was increased from 7 to 10% and this was reflected by a reduction of gasoline consumption of about 12% given, of course, the same R. P. M. and the same load in the comparative tests. The saving of fuel consumption was obtained by addition in the chamber of more oxidizing catalyst performing in the same manner while setting the spark ignition at top dead center of the piston. The fuel oxidation, during the compression stroke, was sufficient to compensate for the lock of advance in spark ignition; the catalytic reaction taking place during the compression stroke and expansion accounts for better combustion efficiency.

What I claim and desire to protect by Letters Patent is:

1. The process of effecting substantially complete oxidation of motive fuel in an internal combustion engine which comprises effecting oxidation of a major fraction of such fuel by spark plug ignition and effecting within the engine cylinder substantially complete oxidation of the minor fraction of said fuel not oxidized by spark plug ignition by catalytic oxidation while maintaining the oxidizing catalyst at the temperature required for oxidation, i. e., above about 600° F. and below the auto-ignition temperature, i. e. about 1100° F.

2. The process of preventing or minimizing detonation in internal combustion engines which comprises applying to the inside face of the cylinder head, in the path of flame travel and nearer the end than the start of said path, an oxidizing catalyst, regulating the temperature of the catalyst by so pocketing it within the cylinder head to a depth somewhat less than the thickness of the catalyst that heat abstracted therefrom by the cylinder head will maintain the temperature required for oxidation reaction, i. e., above about 600° F. and below the auto-ignition temperature, i. e., below about 1100° F.

3. The process of preventing or minimizing detonation in internal combustion engines which comprises igniting an air-fuel charge to thereby oxidize a major part of the fuel and by catalytic oxidation effecting a controlled flameless burning of the unoxidized part of the fuel within the engine cylinder, when the piston approaches the end of its compression stroke, while the flame from the ignited portion of the charge is traveling across the cylinder and before it reaches the locus at which detonation would otherwise occur.

4. The process defined in claim 3 in which said operation is effected by catalytically oxidizing the fuel at a locus relatively far from the locus of spark ignition and relatively near the side of the cylinder opposite thereto.

5. The process of preventing or minimizing detonation in internal combustion engines which comprises igniting the major part of a fuel-air mixture, oxidizing a minor part of said mixture by a catalyst adapted to effect, at a temperature above about 600° F. and below about 1100° F., oxidation of adjacent unoxidized fuel-air mixture, effecting said oxidation at a locus in the combustion chamber along the path of flame travel, the catalyst being maintained within said temperature range by exposure to the hot gases adjacent thereto and by abstracting heat therefrom in predetermined limited amount by heat exchange with a part of the engine structure.

6. In an internal combustion engine the combination, with the cylinder and piston, and ignition means located at one side of the end of the cylinder to effect oxidation of a major part of the fuel, of an oxidizing catalyst applied to the inner face of the cylinder head in the path of flame travel, the catalyst being so positioned in a pocket in the cylinder head and having restricted contact with the latter as to be maintained at a temperature above about 600° F. required for the oxidizing reaction but below about 1100° F. and thus below the auto-ignition temperature by heat abstracted therefrom by the cylinder head.

7. In an internal combustion engine the combination, with the cylinder and piston, and ignition means located adjacent one side of the end of the cylinder to effect oxidation of a major part of the fuel, whereby the path of flame travel is transversely across the cylinder; of an oxidizing catalyst located in the path of the flame relatively near the other side of the cylinder, and means supporting said catalyst in place, partly in and partly out of the combustion chamber of said engine, so as to maintain the catalyst at a temperature required for the oxidizing reaction but below the auto-ignition temperature, the catalyst being thereby adapted to effect a more nearly complete oxidation of motive fuel in the vicinity of the catalyst locus.

8. In an internal combustion engine, the combination, with the cylinder and piston, of an oxidizing catalyst capable of oxidizing the fuel-air mixture at a temperature below the auto-ignition temperature, said catalyst being inserted into a pocket in the inner wall, and occupying a minor part of the area, of the cylinder head, at least the major part of said catalyst being below the surface of the inner wall of the cylinder head and thus having limited contact with the latter, whereby said temperature may be effectively maintained by heat exchange between the catalyst and the cylinder head.

9. In an internal combustion engine, the combination with the cylinder and piston, of a sparking device located at one side of the cylinder, and an oxidizing catalyst capable of oxidizing a fuel-air mixture at a temperature below the auto-ignition temperature, said catalyst being inserted into a pocket in the face of one of said members and occupying a minor part of its area and at a locus relatively near the side of the cylinder opposite the locus of spark ignition.

10. In an internal combustion engine, the combination, with the cylinder and piston, of an oxidizing catalyst on one of said members, said catalyst being of substantial thickness and seated in a pocket in the face of one of said members, said pocket being of less depth than the thickness of said catalyst.

11. In an internal combustion engine having a cylinder and a piston, one of said last named members having a pocket in the face thereof, an oxidizing catalyst of substantial thickness in said pocket, said catalyst projecting from said pocket into the combustion chamber of said engine and having means for extended contact with fluid in said chamber but for restricted contact with said member whereby said catalyst will retain sufficient heat to maintain it at oxidizing temperature but will pass sufficient heat to said member to keep the catalyst below auto ignition temperature.

EUGENE J. HOUDRY.

REFERENCES CITED

The following references are of record in the file of this patent:

UNITED STATES PATENTS

| Number | Name | Date |
|---|---|---|
| 1,162,206 | Amerman | Nov. 30, 1915 |
| 1,564,906 | Sokal | Dec. 8, 1925 |
| 1,622,871 | Barbarous | Mar. 29, 1927 |
| 1,631,702 | Sokal | June 7, 1927 |
| 1,820,878 | Wyckoff | Aug. 25, 1931 |
| 1,848,831 | Kodoma | Mar. 8, 1932 |